(12) United States Patent
Ueda et al.

(10) Patent No.: US 7,264,900 B2
(45) Date of Patent: Sep. 4, 2007

(54) FUEL CELL SYSTEM

(75) Inventors: Kenichiro Ueda, Wako (JP); Masanori Hayashi, Wako (JP); Hideo Numata, Wako (JP); Yoshikazu Murakami, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 433 days.

(21) Appl. No.: 10/721,615

(22) Filed: Nov. 24, 2003

(65) Prior Publication Data

US 2004/0106023 A1 Jun. 3, 2004

(30) Foreign Application Priority Data

Nov. 25, 2002 (JP) ............... 2002-340784

(51) Int. Cl.
*H01M 8/00* (2006.01)
(52) U.S. Cl. .................. 429/34; 429/13; 429/39
(58) Field of Classification Search .......... 429/13, 429/34, 39
See application file for complete search history.

(56) References Cited

U.S. PATENT DOCUMENTS

2001/0014415 A1 8/2001 Iio et al.
2002/0094469 A1* 7/2002 Yoshizumi et al. .......... 429/34

FOREIGN PATENT DOCUMENTS

| JP | 01-89155 | 4/1989 |
|---|---|---|
| JP | 08-031436 A | 2/1996 |
| JP | 2002-93438 | 3/2002 |
| WO | WO-03/010841 A2 | 2/2003 |
| WO | WO-03/032426 A1 | 4/2003 |

* cited by examiner

*Primary Examiner*—Patrick Joseph Ryan
*Assistant Examiner*—Ben Lewis
(74) *Attorney, Agent, or Firm*—Lahive & Cockfield, LLP; Anthony A. Laurentano, Esq.

(57) ABSTRACT

A fuel cell system comprises a fuel cell, a hydrogen discharge valve for discharging hydrogen from the fuel cell under a predetermined condition, a hydrogen concentration reduction device for reducing the concentration of hydrogen discharged from the hydrogen discharge valve, a hydrogen sensor for detecting an instantaneous hydrogen concentration of a gas processed by the hydrogen concentration reduction device and an average hydrogen concentration calculating unit for calculating an average hydrogen concentration per hour of a gas processed by the hydrogen concentration reduction device, wherein a hydrogen discharge from the fuel cell by the hydrogen discharge valve is prohibited in the event that an instantaneous hydrogen concentration detected by the hydrogen sensor exceeds a first threshold, or in the event that an average hydrogen concentration calculated by the average hydrogen concentration calculating unit exceeds a second threshold which is lower than the first threshold.

3 Claims, 4 Drawing Sheets

FUEL CELL SYSTEM

BACKGROUND OF THE INVENTION

1. Field of the Invention

The present invention relates to a fuel cell system including a hydrogen concentration reduction process unit for reducing the concentration of hydrogen discharged from a fuel cell.

2. Description of the Related Art

Among fuel cells that are installed on fuel cell vehicles, there is a fuel cell of a type in which an anode and a cathode are provided on both sides of a solid polymer electrolyte membrane, respectively, whereby a fuel gas (for example, a hydrogen gas) is supplied to the anode and an oxidant gas (for example, oxygen or air) is supplied to the cathode, so that chemical energy resulting from oxidation/reduction reactions of these gases is extracted directly as electric energy.

In this type of fuel cell, in general, in order to improve the fuel consumption by increasing the fuel utilization factor, unconverted hydrogen which is discharged from the fuel cell without being consumed is recovered to be mixed with fresh fuel gas for re-supply to the fuel cell.

In addition, in this fuel cell, in order to maintain the electricity generation in a good condition by preventing the solid polymer electrolyte membrane from being dried, water is supplied to the reaction gas (either or both of hydrogen gas and oxidant gas). Furthermore, in this type of fuel cell, water is formed in conjunction with generation of electricity. This sometimes causes water to collect on the anode side (flooding), and in the event that water so collects, the supply of hydrogen to the anode is interrupted, leading to unstable generation of electricity.

In addition, since, although it may be minute in quantity, nitrogen contained in air supplied to the cathode conducts through the solid polymer electrolyte membrane to the anode side to be mixed with hydrogen, in the event that the concentration of nitrogen increases due to reuse of hydrogen gas, there may be caused a case where the generation of electricity becomes unstable.

In the related art, as a recovery method for dealing with such an unstable generation of electricity, there exists a method for continuing the stable generation of electricity by discharging gas from a hydrogen gas circulating flow path so as to discharge water that has collected at the anode and nitrogen mixed in hydrogen gas (for example, refer to JP-A-2002-93438). However, since hydrogen is also discharged when gas is discharged from the hydrogen gas circulating flow path, it is not good to discharge the gas into the atmosphere as it is.

Then, to cope with this, it is under consideration to mix gas (hydrogen) so discharged with air discharged from the cathode (hereinafter, referred to as discharged air) so as to reduce the hydrogen concentration before the gas is discharged into the atmosphere. A device used to reduce the hydrogen concentration like this is a hydrogen concentration reduction device.

In the fuel cell system having the hydrogen concentration reduction device, the discharge of gas from the hydrogen gas circulating flow path is controlled such that the instantaneous value of hydrogen concentration of gas discharged from the hydrogen concentration reduction device becomes equal to or smaller than a predetermined threshold by detecting the instantaneous value of hydrogen concentration of the gas with a hydrogen sensor.

However, even if the instantaneous value of hydrogen concentration of gas discharged from the hydrogen concentration reduction device is equal to or smaller than the predetermined threshold, since the quantity of hydrogen that has been so discharged is increased when a condition continues for a long time in which the instantaneous value of hydrogen concentration is close to the threshold, it is not preferable to discharge gas from the hydrogen gas circulating flow path.

SUMMARY OF THE INVENTION

Then, an object of the invention is to provide a fuel cell system which can suppress the increase in concentration and quantity of hydrogen discharged from the fuel cell system.

With a view to solving the problem, according to a first aspect of the invention, there is provided a fuel cell system comprising a fuel cell (for example, a fuel cell 1 in an embodiment of the invention) for generating electricity using a hydrogen gas and an oxidant gas as a reaction gas, a hydrogen discharge unit (for example, a discharge vale 6 in the embodiment) for discharging hydrogen from the fuel cell under a predetermined condition, a hydrogen concentration reduction process unit (for example, a hydrogen concentration reduction device 10 in the embodiment) for reducing the concentration of hydrogen discharged from the hydrogen discharge unit, a hydrogen concentration detection unit (for example, a hydrogen sensor 45 in the embodiment) for detecting an instantaneous hydrogen concentration of a gas processed by the hydrogen concentration reduction process unit, and an average hydrogen concentration calculating unit (for example, a step S202 in the embodiment) for calculating an average hydrogen concentration per hour of a gas processed by the hydrogen concentration reduction process unit, wherein a hydrogen discharge from the fuel cell by the hydrogen discharge unit is prohibited in the event that an instantaneous hydrogen concentration detected by the hydrogen concentration detection unit exceeds a first threshold, or in the event that an average hydrogen concentration calculated by the average hydrogen concentration calculating unit exceeds a second threshold which is lower than the first threshold.

According to the construction, the discharge of hydrogen from the fuel cell can be prohibited not only when the instantaneous hydrogen concentration detected by the hydrogen concentration detecting unit exceeds the first threshold but also when the average hydrogen concentration calculated by the average hydrogen concentration calculating unit exceeds the second threshold which is set lower than the first threshold.

DETAILED DESCRIPTION OF THE INVENTION

Referring to FIGS. 1 to 4, an embodiment of a fuel cell system according to the invention will be described below. Note that the embodiment presents an application to a fuel cell system that is installed on a fuel call vehicle.

Figure 1:
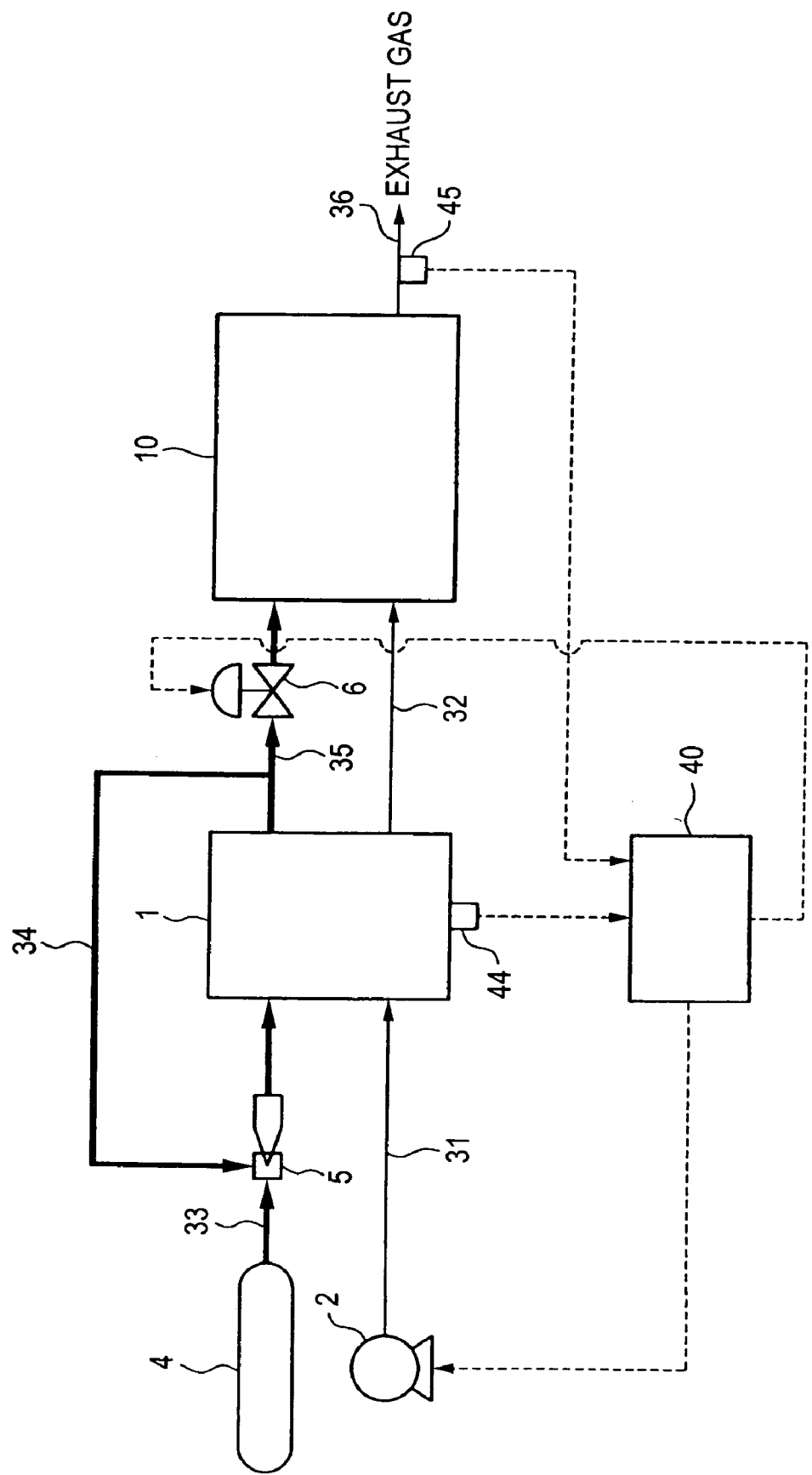
FIG. 1 is a block diagram illustrating the construction of a fuel cell system according to an embodiment of the invention.

FIG. 1 is a block diagram schematically illustrating the construction of a fuel cell system provided with a hydrogen concentration reduction process unit.

A fuel cell 1 is a stack or a plurality or stacked cells each of which is formed by holding a solid polymer electrolyte membrane comprising, for example, a solid polymer ion exchange membrane with an anode and a cathode from sides of the membrane. When hydrogen gas is supplied to the anode as a fuel and air containing oxygen is supplied to the cathode as an oxidant, hydrogen ions generated as a result of catalytic reaction at the anode pass through the solid polymer electrolyte membrane and travels as far as the cathode, where electricity is generated as a result of electrochemical reaction between the hydrogen ions and oxygen, and water is produced in conjunction with the generation of electricity. Since part of water produced at the cathode is diffused back to the anode side via the solid polymer electrolyte membrane, water so produced also exists on the anode side.

Air is pressurized to a predetermined pressure by a compressor 2 and is then supplied to the cathode of the fuel cell 1 via an air supply flow path 31. After having been used to generate electric power, air supplied to the fuel cell 1 is discharged into an air discharge flow path 32 together with water produced on the cathode side and is then introduced into a hydrogen concentration reduction device 10. Hereinafter, in order to distinguish air supplied to the fuel cell 1 from air discharged therefrom, the former is referred to as supplied air, whereas the latter to discharged air.

On the other hand, hydrogen gas supplied from a hydrogen tank 4 passes through a hydrogen gas supply flow path 33 and is then supplied to the anode of the fuel cell 1. Then, unconverted hydrogen gas that has not been consumed is discharged from the anode into a hydrogen gas circulating flow path 34 and is further caused to join into the hydrogen gas supply flow path 33 via an ejector 5. In other words, hydrogen gas discharged from the fuel cell 1 joins with fresh hydrogen gas supplied from the hydrogen gas 4 and is then supplied to the anode of the fuel cell 1. Note that a hydrogen pump can be used instead of the ejector 5.

A hydrogen gas discharge flow path 35 provided with a discharge valve (a hydrogen discharge unit) 6 is branched off the hydrogen gas circulating flow path 34, and the hydrogen gas discharge flow path 35 connects to the hydrogen concentration reduction device (a hydrogen concentration reduction process unit) 10.

The hydrogen concentration reduction device 10 has a closed box construction and is provided with an exhaust pipe 36. Discharged air that is discharged from the fuel cell 1 flows into the hydrogen concentration reduction device 10 via the air discharge flow path 32 at all times, and when the discharge valve 6 is opened, hydrogen gas discharged from the fuel cell 1 flows into the hydrogen concentration reduction device 10 via the hydrogen gas circulating flow path 34 and the hydrogen gas discharge flow path 35. Then, hydrogen gas is diluted by discharged air within the hydrogen concentration reduction device 10, and gas whose hydrogen concentration is reduced is then discharged from the exhaust pipe 36 as discharge or exhaust gas.

A cell voltage sensor 44 is provided on the fuel cell 1 for detecting the cell voltage of each cell constituting the fuel cell 1, and a hydrogen sensor (a hydrogen concentration detection unit) 45 is provided on the exhaust pipe 36 for detecting an instantaneous hydrogen concentration (hereinafter, referred to as an instantaneous hydrogen concentration) of exhaust gas that flows through the exhaust pipe 36, and output signals from these sensors 44, 45 are inputted into an ECU 40.

In a normal operating condition of the fuel cell system constructed as has been described heretofore, gas flowing within the hydrogen gas circulating flow path 34 is discharged intermittently by opening the discharge valve 6 for a predetermined period of time every time a certain period of time elapses during operation of the fuel cell 1, so that water and nitrogen in gas on the anode side which can attribute to the deterioration of electricity generating performance are discharged, whereby water and gas on the anode side are controlled so as to maintain the good electricity generating condition at all times.

Even if gas is discharged from the hydrogen gas circulating flow path 34 periodically like this, it is anticipated that the electricity generating condition is deteriorated due to collection of water for some reason or increase in nitrogen concentration due to reuse of hydrogen on the anode side of the fuel cell 1. Then, in this fuel cell system, whether the electricity generating condition is in a good or bad condition is determined based on the generated voltage of the fuel cell 1, and the discharge valve 6 is opened to discharge gas from the hydrogen gas circulating flow path 34 also when the electricity generating condition is determined to be deteriorating.

However, in the event that the hydrogen concentration of gas discharged from the hydrogen concentration reduction device 10 is high, gas should not be allowed to be discharged from the hydrogen gas circulating flow path 34 even if the periodical gas discharge timing is reached or the electricity generating condition of the fuel cell 1 is not good.

Then, in this fuel cell system, when the instantaneous hydrogen concentration H of exhaust gas detected by the hydrogen sensor 45 exceeds a predetermined threshold (a first threshold) H1, the discharge of gas from the hydrogen gas circulating flow path 34 is prohibited.

In addition, in this fuel cell system, not only when the instantaneous hydrogen concentration H detected by the hydrogen sensor 45 exceeds the threshold H1 but also when an average hydrogen concentration per hour $H_{ave}$ of exhaust gas discharged from the exhaust pipe 36 is calculated and the average hydrogen concentration $H_{ave}$ so calculated exceeds a predetermined threshold (a second threshold) H2, the discharge of gas from the hydrogen gas circulating flow path 34 is prohibited.

Figure 4:
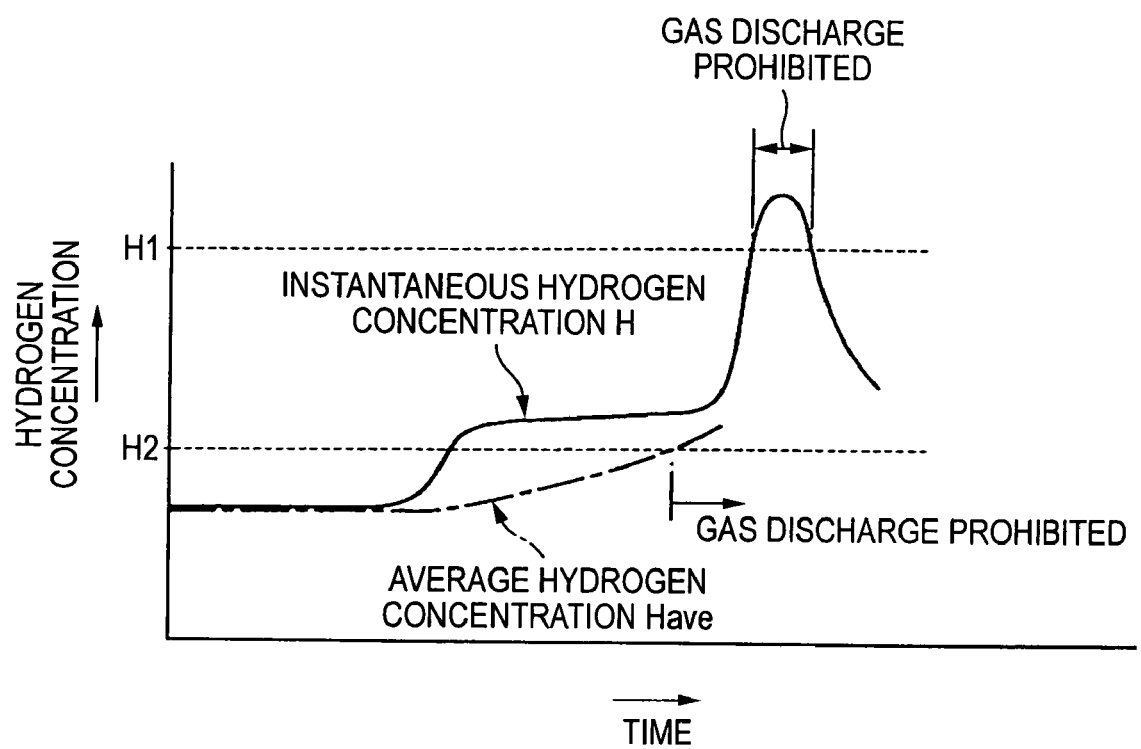
FIG. 4 is a diagram illustrating an example of change with time in instantaneous hydrogen concentration of a gas discharged from a hydrogen concentration reduction device and in average hydrogen concentration.

Additionally, the threshold H1 of the instantaneous hydrogen concentration H is set larger than the threshold H2 of the average hydrogen concentration, whereby, as shown in FIG. 4, even if the instantaneous hydrogen concentration H does not exceed the threshold H1, when the average hydrogen concentration $H_{ave}$ exceeds the second threshold H2, the discharge of gas from the hydrogen gas circulating flow path 34 can be prohibited.

Thus, the discharge of gas from the hydrogen gas circulating flow path 34 is permitted only when the instantaneous hydrogen concentration H is equal to or smaller than the predetermined threshold H1 and the average hydrogen concentration $H_{ave}$ is equal to or smaller than the predetermined threshold H2.

According to the construction, when the instantaneous hydrogen concentration H of gas discharged from the exhaust pipe 36 is higher than the threshold H1, the discharge of hydrogen is prohibited, whereby an increase in hydrogen concentration of gas discharged from the fuel cell system can be suppressed. Furthermore, since the average hydrogen concentration $H_{ave}$ becomes higher than the threshold H2 when a condition continues in which the instantaneous hydrogen concentration H of gas discharged from the exhaust pipe 36 is lower than the threshold H1 but is higher than the threshold H2, for example, an increase in quantity of hydrogen discharged from the fuel cell system can be suppressed by prohibiting the discharge of hydrogen as such a condition occurs.

Next, following flowcharts shown in FIGS. 2 and 3, the control of discharge of hydrogen from the fuel cell 1 of the fuel cell system will be described.

Figure 2:
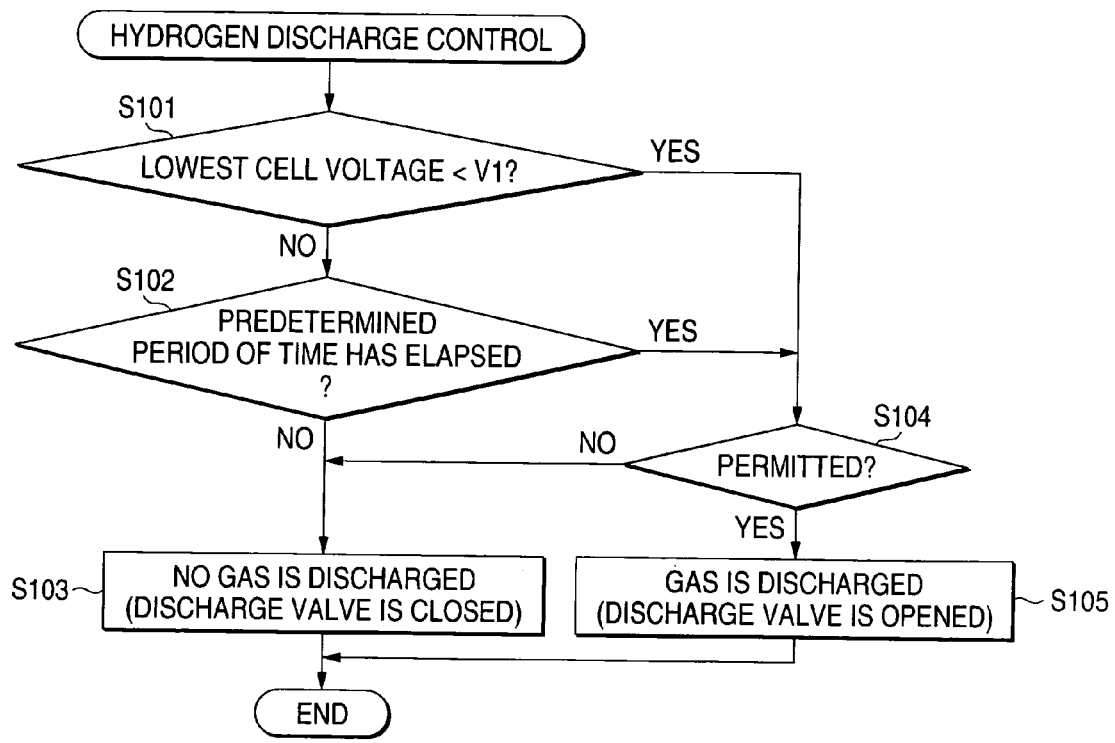
FIG. 2 is a flowchart illustrating a control of hydrogen discharge from a fuel cell according to the embodiment.
Figure 3:
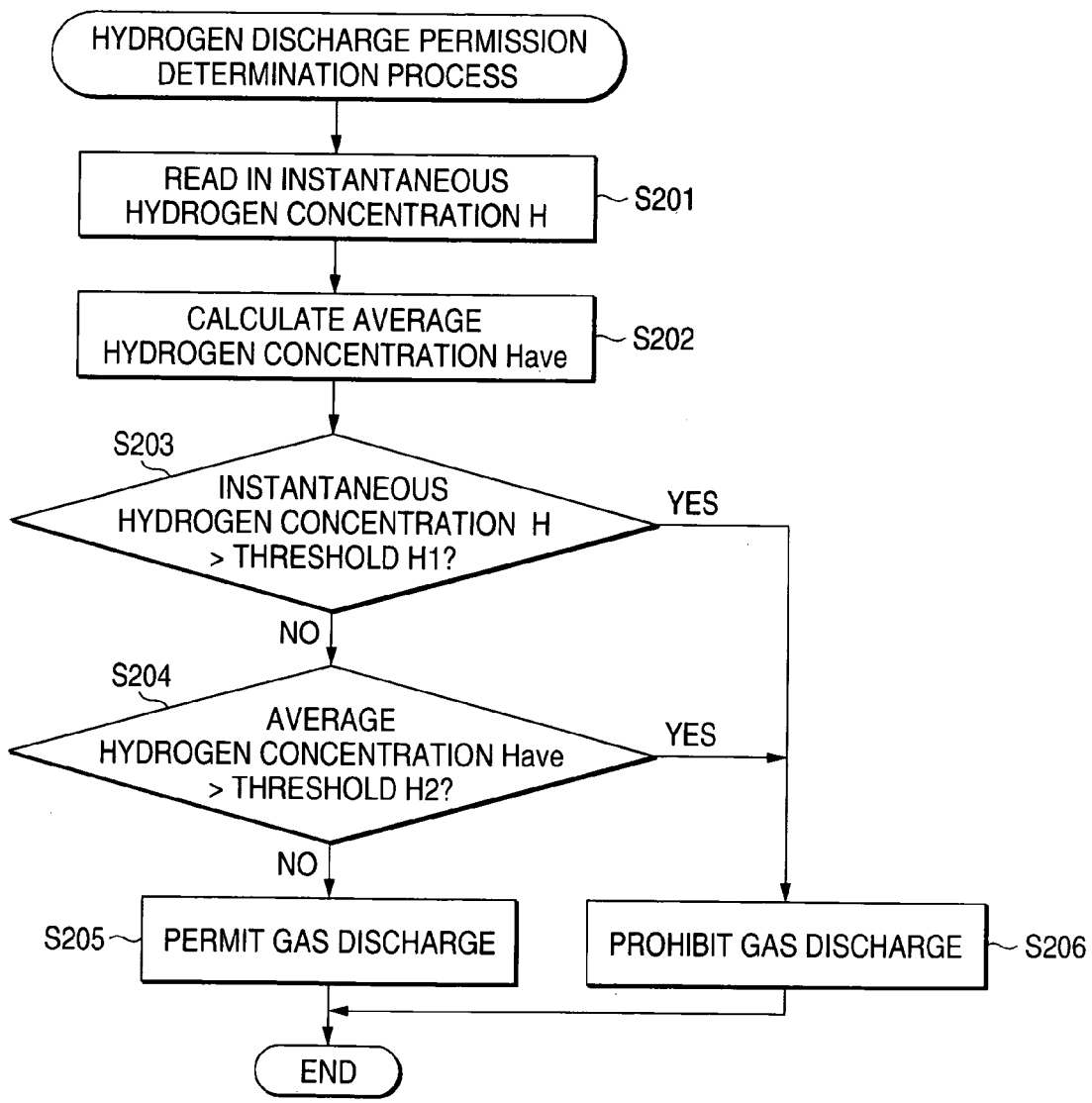
FIG. 3 is a flowchart illustrating a hydrogen discharge permission determination process according to the embodiment.

A flowchart shown in FIG. 2 illustrates a hydrogen discharge control routine, and a flowchart shown in FIG. 3 illustrates a hydrogen discharge permission determination process routine, these routines being controlled by the ECU 40 every time a certain period of time elapses.

Firstly, a hydrogen discharge control according to the hydrogen discharge control routine shown in FIG. 2 will be described.

Firstly, in step S101, the voltage of each cell detected by the cell voltage sensor 44 is read in, and a determination is made as to whether or not a lowest cell voltage among the detected cell voltages (hereinafter, referred to as a lowest cell voltage) is smaller than a predetermined voltage V1.

If the lowest cell voltage is equal to or larger than the predetermined voltage V1, it is determined that the electricity generating condition of the fuel cell 1 is good with neither water collecting on the anode side of the fuel cell 1 nor the nitrogen concentration in gas flowing through the hydrogen gas circulating flow path 34 increasing. On the other hand, if the lowest cell voltage is smaller than the predetermined voltage V1, it is determined that the electricity generating condition of the fuel cell 1 is deteriorating due to water collecting on the anode side of the fuel cell 1, the nitrogen concentration in gas flowing through the hydrogen gas circulating flow path 34 increasing or the like.

If the result of the determination in step S101 is "NO" (the lowest cell voltage≧V1), then the flow proceeds to step S102, where whether or not a predetermined period of time has elapsed is determined. This predetermined period of time is a cycle at which gas is discharged by opening the discharge valve 6 periodically when the electricity generation is in good condition.

Consequently, if the result of the determination in step S102 is "NO" (the predetermined period of time has not elapsed), the flow proceeds to step S103, where the discharge valve 6 is kept closed so that no gas is discharged from the hydrogen gas circulating flow path 34, and the execution of the subject routine is terminated temporarily.

On the other hand, if the result of the determination in step S101 is "YES" (the lowest cell voltage<V1), or if the result of-the determination in step S102 is "YES" (the predetermined period of time has elapsed), the flow proceeds to step S104, where a determination is made as to whether or not the result of a hydrogen discharge permission determination is a "permitted".

If the result of the determination in step S104 is "NO" (not permitted), the process proceeds to step S103, where the discharge valve 6 is kept closed so that no gas is discharged from the hydrogen gas circulating flow path 34, and the execution of the subject routine is terminated temporarily.

On the other hand, if the result of the determination in step S104 is "YES" (permitted), the flow advances to step S105, where the discharge vale 6 is opened so that gas is discharged from the hydrogen gas circulating flow path 34, and the subject routine is terminated temporarily.

Next, a hydrogen discharge permission determination process will be described according to the hydrogen discharge permission determination process routine shown in FIG. 3.

Firstly, in step S201, an instantaneous hydrogen concentration H detected by the hydrogen sensor 45 is read in.

Next, in step S202, an average hydrogen concentration $H_{ave}$ is calculated. An average hydrogen concentration calculation method will be described later on. Note that, in this embodiment, the ECU 40 executes the process in step S202 to realize an average hydrogen concentration calculating unit.

Next, in step S203, a determination is made as to whether or not the instantaneous hydrogen concentration H read in step S201 exceeds the threshold H1.

If the result of the determination in step S203 is "NO" (H≦H1), the flow proceeds to step S204, where whether or not the average hydrogen concentration $H_{ave}$ calculated in step S202 exceeds the threshold H2.

If the result of the determination in step S204 is "NO" ($H_{ave}$≦H2), the flow proceeds to step S205, where the discharge of gas from the hydrogen gas circulating flow path 34 is permitted, and the subject routine is terminated temporarily.

On the contrary, if the result of the determination in step S203 is "YES" (H>H1), or if the result of the determination in step S204 is "YES" ($H_{ave}$>H2), the flow proceeds to step S206, where the discharge of gas from the hydrogen gas circulating flow path 34 is prohibited (not permitted), and the subject routine is terminated temporarily.

Namely, that the average hydrogen concentration $H_{ave}$ is higher than the threshold H2 means that a condition continues for a predetermined period of time or longer in which the instantaneous hydrogen concentration H is lower than the threshold Hi but is higher than the threshold H2 or that a condition in which the instantaneous hydrogen concentration H is larger than the threshold H2 occurs more often than a condition in which the instantaneous hydrogen concentration H is smaller than the threshold H2. In this embodiment, since the average hydrogen concentration $H_{ave}$ is detected for comparison with the threshold H2, even in the event that the instantaneous hydrogen concentration H does not exceed the threshold H1, that the hydrogen discharge quantity per hour is increasing can be detected so as to suppress the quantity of hydrogen so discharged.

The average hydrogen concentration $H_{ave}$ in step S202 is calculated according to the following procedure.

An instantaneous hydrogen concentration H detected by the hydrogen sensor 45 is multiplied by a discharged air flow rate Q1 to calculate an instantaneous hydrogen discharge quantity QH (QH=H×Q1), and furthermore, this instantaneous hydrogen discharge quantity QH is integrated to calculate a discharged hydrogen integrated value VH. In addition, the discharged air flow rate Q1 is integrated to calculate a discharged air flow rate integrated value VA. Then, the discharged hydrogen integrated value VH is divided by the discharged air flow rate integrated value VA to calculate an average hydrogen concentration $H_{ave}$.

Note that the discharged air flow rate Q1 may be detected by placing a flow rate sensor along the air supply flow path 31 or may be calculated based on a command value for the quantity of air supplied to the fuel cell 1.

In addition, a pressure sensor for detecting the pressure of hydrogen gas is placed along the hydrogen gas supply flow path 33 or the hydrogen gas circulating flow path 34, an instantaneous hydrogen discharge quantity QH when the discharge valve 6 is opened is calculated based on the pressure of hydrogen gas detected by the pressure sensor, and the instantaneous hydrogen discharge quantity QH is integrated with a instantaneous hydrogen discharge quantity QH when the discharge valve 6 is closed being assumed to be "0", whereby the discharged hydrogen integrated value VH can be calculated.

Additionally, while the hydrogen concentration of exhaust gas discharged from the hydrogen concentration reduction device 10 is detected by the hydrogen sensor 45, the hydrogen concentration of exhaust gas can be anticipated from the operating conditions of the fuel cell 1.

In addition, in the case of a fuel cell system provided with a plurality of discharge valves 6, instantaneous hydrogen discharge quantities QH discharged from all the discharge valves 6 are integrated to obtain a discharged hydrogen integrated value VH.

Note that there is no particular limitation on the construction of the hydrogen concentration reduction process unit provided that the hydrogen concentration reduction process unit has a function to reduce the concentration of hydrogen gas discharged from the fuel cell, and a burner can be adopted to replace the hydrogen concentration reduction device.

As has been described heretofore, according to the first aspect of the invention, since the discharge of hydrogen from the fuel cell can be prohibited not only when the instantaneous hydrogen concentration detected by the hydrogen concentration detection unit exceeds the first threshold but also when the average hydrogen concentration calculated by the average hydrogen concentration calculating unit exceeds the second threshold, the increase in hydrogen concentration of gas discharged from the fuel cell system can be suppressed. Moreover, the discharge of hydrogen from the fuel cell system can be prohibited when the condition continues for a long time in which the instantaneous hydrogen concentration of the gas is close to the first threshold even if the instantaneous hydrogen concentration of the gas does not exceed the first threshold, thereby making it possible to suppress the discharge quantity of hydrogen per hour.

What is claimed is:

1. A fuel cell system comprising:

a fuel cell for generating electricity using a hydrogen gas and an oxidant gas as a reaction gas;

a hydrogen discharge unit for discharging hydrogen from the fuel cell under a predetermined condition;

a hydrogen concentration reduction process unit for reducing the concentration of hydrogen discharged from the hydrogen discharge unit;

a hydrogen concentration detection unit for detecting an instantaneous hydrogen concentration of a gas processed by the hydrogen concentration reduction process unit; and an average hydrogen concentration calculating unit for calculating an average hydrogen concentration per hour of a gas processed by the hydrogen concentration reduction process unit, wherein the discharge of hydrogen from the fuel cell by the hydrogen discharge unit is prohibited in the event that the instantaneous hydrogen concentration exceeds a first threshold or the average hydrogen concentration calculated by the average hydrogen concentration calculating unit exceeds a second threshold which is lower than the first threshold, and the discharge of hydrogen from the fuel cell by the hydrogen discharge unit is permitted in the event that the instantaneous hydrogen concentration does not exceed the first threshold and the average hydrogen concentration does not exceed the second threshold.

2. A fuel cell system as claimed in claim 1, further comprising a cell voltage sensor for detecting a cell voltage of the fuel cell so that the discharge of the hydrogen from the fuel cell by the hydrogen discharge unit can be permitted or prohibited based on the cell voltage.

3. A fuel cell system as claimed in claim 1, wherein the hydrogen from the fuel cell can be discharged intermittently by the hydrogen discharge unit.

* * * * *